US 8,386,229 B1

United States Patent
Anderson et al.

(10) Patent No.: US 8,386,229 B1
(45) Date of Patent: Feb. 26, 2013

(54) INTEGRATED CIRCUIT PACKAGE COMPONENT AND BALL GRID ARRAY SIMULATION MODEL

(75) Inventors: Raymond E. Anderson, Santa Cruz, CA (US); Sanjay S. Mehta, Los Gatos, CA (US); Richard L. Wheeler, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 921 days.

(21) Appl. No.: 12/425,817

(22) Filed: Apr. 17, 2009

(51) Int. Cl.
G06F 17/50 (2006.01)
G06G 7/62 (2006.01)

(52) U.S. Cl. .......................................... 703/14; 703/13
(58) Field of Classification Search .............. 703/13–14; 716/137
See application file for complete search history.

(56) References Cited

U.S. PATENT DOCUMENTS

| 7,681,154 | B2 * | 3/2010 | Katagiri et al. | 716/136 |
| 7,800,214 | B2 * | 9/2010 | Yoshikawa et al. | 257/691 |
| 2007/0057380 | A1 * | 3/2007 | Katagiri et al. | 257/778 |

OTHER PUBLICATIONS

Caggiano et al. "Electrical modeling of the chip scale ball grid array package at radio frequencies". Microelectronics Journal 31 (2000)., p. 701-709.*
Mattei et al. "Electrical Characterization of BGA Packages". 1997 IEEE. p. 1087-1093.*
Caggiano et al. "Modeling the Power and Ground Effects of BGA Packages"., 2000 IEEE. p. 156-163.*
Pham et al. "Package Model for Efficient simulation, Design and Characterization of High Performance Electronic Systems". 2006 IEEE. p. 39-42.*
Wang et al. "Modeling Noise Coupling Between package and PCB Power/ground Planes With an Efficient 2-D FDTD/Lumped Element Method"., IEEE., Nov. 2007., p. 864-871.*
Fraser et al. "Electrical Characterization of Ball Grid Array (BGA) Packages". Hewlett packard., 1996 High-Performance System Design Conference. 21 Pages.*

* cited by examiner

Primary Examiner — Eunhee Kim
(74) Attorney, Agent, or Firm — Thomas A. Ward; Gerald Chan; Thomas George

(57) ABSTRACT

A simulation model is provided for flip-chip BGAs to help engineers determine the effects of IC package components. The simulation model includes a bump model, a package planes model, a package bypass capacitor model, a ball model and a PCB model. The simulation model in particular includes resistors, inductors, capacitors and transmission lines to simulate the electrical interaction between signal conductors, power/ground planes, vias and balls that exist in a flip-chip ball grid array (BGA) package. The simulation model helps engineers understand actual physical effects of flip-chip and IC package interactions, as well as the impact of the effects of power supply droop, ground bounce and crosstalk between adjacent signals, not only on the IC package level, but at the computer system level.

17 Claims, 2 Drawing Sheets

INTEGRATED CIRCUIT PACKAGE COMPONENT AND BALL GRID ARRAY SIMULATION MODEL

FIELD OF THE INVENTION

Embodiments of the present invention relate to simulation models for electronic components such as integrated circuits, particularly integrated circuit packages with external connections to the package formed by a ball grid array.

BACKGROUND OF THE INVENTION

An integrated circuit (IC) device typically includes an IC chip that is housed in a plastic, ceramic or metal package. The IC chip typically includes a circuit fabricated by lithographically patterning conductive and insulating materials on a thin wafer of semiconductor using known fabrication techniques. The package supports and protects the IC chip and provides electrical connections between the circuit and an external circuit or system.

It is important to note that a design of an integrated circuit device cannot be verified by "bread-boarding" but must be simulated. Simulation of Integrated circuits is commonly implemented with a SPICE program (Simulation Program with Integrated Circuit Emphasis). There are many types and iterations of SPICE programs. However, they have the common requirement that circuit elements of the integrated circuit must be characterized and mathematically represented in the SPICE program netlist.

As ICs have gotten faster with smaller and smaller feature sizes, they have also gotten much more complex. Examples of complex IC devices include microprocessors, Application-Specific ICs (ASICs), and Programmable Logic Devices (PLDs) which are capable of implementing digital logic operations in digitally configured logical fabric, and many others. There are several types of PLDs, including Field Programmable Gate Arrays (FPGAs) and Complex Programmable Logic Devices (CPLDs).

Modern, highly complex, ICs can and often do include hundreds of Input/Output structures and associated connection infrastructure, such as bonding pads for example, that access the device's logical circuitry. To support the large number of I/O structures, complex ICs are typically mounted in a package that includes multiple external contacts that can be, for example, pins, solder balls/bumps, or wire leads. Several package types are used to house IC chips, such as ball grid arrays (BGAs), pin grid arrays (PGAs), plastic leaded chip carriers, plastic quad flat packs and others, for example. The package type selected by an IC manufacturer for a particular IC chip is typically determined by the size/complexity of the IC chip (i.e., the number of input/output terminals), and the requirements of the chip's end use.

One type of an IC chip package is a "flip chip," which does not require any wire bonds. Instead the final wafer processing step deposits solder beads on the chip pads. After cutting the wafer into individual dice, the "flip chip" is then mounted upside down in/on a package substrate which contains matching contact points and connections to the associated external circuitry. The solder is reflowed in order to bond the contacts of the chip and the substrate. Flip chips then normally undergo an under fill process which covers the sides of the die, similar to an encapsulation process.

FIG. 1 shows a side cross-sectional view of an exemplary packaged flip-chip BGA IC device 100 including flip chip 160, and package planes substrate 120. IC package 100 is electrically connected to contacts 159 on a printed circuit board (PCB) 130 through solder balls 140 that extend from contacts 126 on the lower surface of the package substrate 120 of the IC package 100. The PCB is electrically connected to package substrate 120 through conductive planes 127, 128, 129 and conductive vias 124. From the lower surface of the package substrate 120, a plurality of solder balls 140 extend to contact the contact pads 159 on the upper surface of printed circuit board 130. The package planes are also electrically connected to flip-chip 160 through conductive lines and conductive vias 124 making up conductive planes that are provided in the package substrate 120. From the upper surface of the package substrate 120, a plurality of solder bumps 110 extend to contact the contact pads 111 of the flip-chip 160. A cover, such as a cap or "glob top," is placed or formed over flip-chip 160 and package substrate 120 into a single, relatively robust, unit for ease of handling and for protection.

Flip-chip BGA packages continue to evolve in terms of complexity, and on-die voltages continue to decrease with advances in deep sub-micron technology. Because the signals and voltages in package planes are large in comparison to the proximity of the IC components and the package planes, proximity effects take on more and more importance to the operation of the integrated circuit. Simulating these effects, such as power supply droop, ground bounce and crosstalk between adjacent signals, thus becomes more important in determining effective package component design.

In the past, a simple lumped inductor model was sufficient to model wirebond packages. In current flip-chip BGAs, however, dielectric layer counts can exceed ten layers where complex geometries define power planes and interconnections between signal vias and traces. However, current modeling for flip-chip BGAs requires use of expensive and complex software tools. These software tools are limited because they employ a finite element method analysis, and thus there are not enough elements available to adequately simulate current flip-chip BGAs. Further, these software tools require a lot of computing power for simulations. Still further, these software tools are time consuming, leaving engineers with very little time to analyze and address design concerns, and don't enable engineers to fully understand the impacts and effects of power supply droop, ground bounce and crosstalk between adjacent signals either at the package level or at the system level.

SUMMARY OF THE INVENTION

Embodiments of the present invention provide a simulation model for flip-chip BGAs that helps engineers understand the impact of the effects of power supply droop, ground bounce and crosstalk between adjacent signals, not only on the package level, but at the system level. Embodiments provide a simulation model for flip-chip BGAs that is based on a compilation of cascaded sections that are derived from relatively simple R (resistance), L (inductance), and C (capacitance) values.

In accordance with embodiments of the present invention, a simulation model and method are provided for flip-chip BGAs to help engineers determine effective IC package component design. According to one embodiment of a simulation model, a bump model, a package planes model, a package bypass capacitor model, a ball model and a PCB model are provided. The simulation model includes resistors, inductors, capacitors and transmission lines to simulate the electrical interaction between signal conductors, power/ground planes, vias and balls that exist in a flip-chip (BGA) package. The simulation model helps engineers understand actual physical effects of flip-chip and IC package interactions, as well as the effects of power supply droop, ground bounce and crosstalk between adjacent signals, not only on the IC package level, but at the computer system level.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

Further details of the present invention are explained with the help of the attached drawings in which.

DETAILED DESCRIPTION

Figure 1:
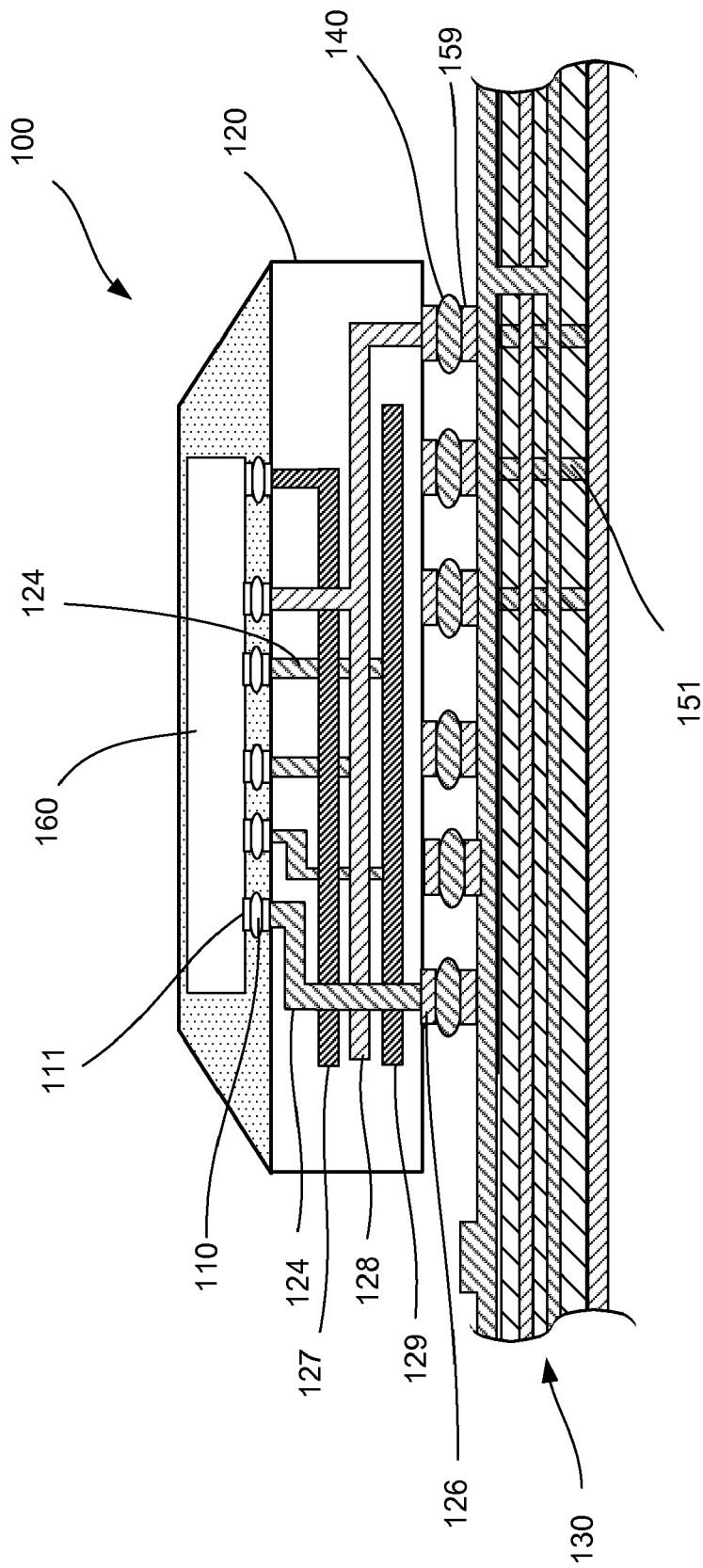
FIG. 1 illustrates a side cross-sectional view of a typical flip-chip ball grid array IC package and ball grid array substrate.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description, numerous specific details are set forth in order to provide a thorough understanding of the present invention. However, it should be understood by one of ordinary skill in the art that the present invention may be practiced without these specific details. In other instances, well-known methods, procedures, components, and circuits have not been described in detail so as not to unnecessarily obscure aspects of the present invention. At times, concepts disclosed in this discussion of embodiments of the present invention will be made more readily apparent by reference to the Figures.

Embodiments of the present invention are used to determine effective IC package component design through simulation of performance of an integrated circuit in a selected package. According to one embodiment, a complex modular model includes mathematical representations of resistors, inductors, capacitors and transmission lines to simulate the electrical interaction between signal conductors, power/ground planes, vias and balls that exist in a flip-chip ball grid array (BGA) package. FIG. 2 shows a graphical representation of one embodiment of a simulation model 200, which includes a bump model 210, a package planes model 220, a package bypass capacitor model 230, a ball model 240 and a PCB model 250 for the flip-chip BGA IC package of FIG. 1. The simulation model 200, when used in conjunction with input/output buffer 260, allows an end user to simulate effects such as power supply droop, ground bounce and cross-talk that may exist in current advanced flip-chip IC packages. An alternative embodiment of the present invention includes use of this simulation model for a type of IC chip other than a flip-chip that has similar package planes and bumps.

It is noted here that simulation of integrated circuits commonly uses a SPICE program. "SPICE" is an acronym for Simulation Program with Integrated Circuit Emphasis. There are many SPICE program used in modern simulations, however, some embodiments of the present invention are employed in HSPICE.

In a typical SPICE program, each element of a circuit is represented in a netlist as a being connected to numbered nodes and as having specific traits. For example, a simple resistor can be represented by the two nodes to which it is connected and its resistance value R (in ohms, 'Ω') and a simple capacitor has a numerical value representing capacitance C (in mf, μf or smaller units).

However, at the speeds of operation of modern integrated circuits, the additional properties intrinsic to electronic components, such as the inherent parasitic resistance, capacitance and inductance L (usually in μH or nH) of their connecting traces, play a significant role in their performance. For this reason, a simulation netlist can also include values for L and C of a resistor and L and R of a capacitor, as well as R, L and C for other components.

Embodiments of the present invention are able to characterize the parasitic impedances of electrical and mechanical components of integrated circuits that are not normally characterized in simulation. The models used in various embodiments can represent the effects on IC operation of solder balls, solder bumps, package planes for ground, voltages and various signals, and the interconnecting vias between them, as well as the effects these non-active elements have on the IC.

In one embodiment of the present invention, initial values of inductance and resistance for one or more solder balls of a new package, for example, are derived empirically. The derived values are assessed by comparing previous testing results with the output of simulation of the new package. Each solder ball is simulated by a Spice modeled resistance and inductance, connected in series in the signal path. Each signal-carrying plane in the package is modeled by a resistance and an inductance between adjacent planes of different signals and/or different voltages.

To illustrate embodiments of the present invention, the simulation model 200 graphically presented in FIG. 2 is a model of an N signal flip-chip BGA IC package whose connections carry N signals, where N is a number of connected input/output pins on the flip-chip BGA IC package. These N signal lines of simulation model 200 are labeled in the PCB model 250 and the package planes model 220 as "Signal 1" through "Signal N."

The N signal lines represent one or more layers on which signal traces are routed to and within the IC package. The signal lines are represented as a combination of transmission line and inductors and resistors in series. The input/output buffer 260 as well as models for other components on the IC can be used in conjunction with the bump model 210 of the simulation model 200 to allow the user to generate signals along the N signal lines. The signal lines extend through the bump model 210, package planes model 220, package bypass capacitor model 230 ball model 240 to the PCB model 250.

The simulation model 200 shown in FIG. 2 also contains a power line 222 to represent a power plane, labeled Vdd in the PCB Model 250 of FIG. 2. The simulation model 200 also contains a ground line 224 to represent the ground plane of the flip-chip BGA IC package, labeled as Vss in the PCB Model 250 of FIG. 2. The input/output buffer 260 is shown connected to receive power from the Vdd and Vss planes. The power and ground lines 222 and 224 in the simulation model 200 include a combination of transmission lines, inductors and resistors. Similar to the N signal transmission lines, the power and ground lines 222 and 224 extend through the bump model 210, package planes model 220, package bypass capacitor model 230, ball model 240 to the PCB model 250.

Figure 2:
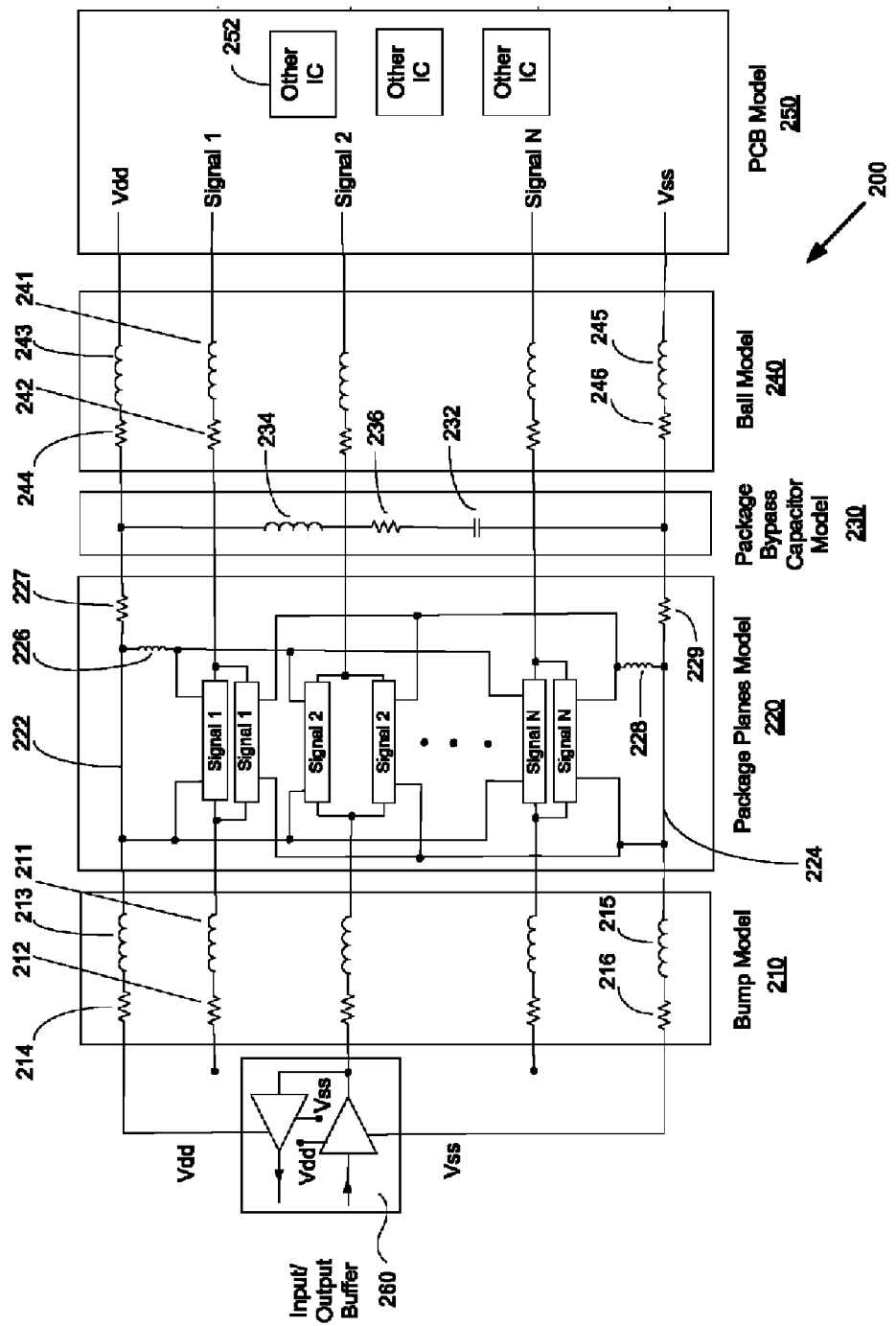
FIG. 2 illustrates a graphic representation of a simulation model, including a bump model, a package planes model, a package bypass capacitor model, a ball model and a PCB model for the flip-chip BGA IC package of FIG. 1, in accordance with an embodiment of the present invention.

The PCB model 250 of FIG. 2 represents a PCB on which the IC package 100 in FIG. 1 is attached. To show that a PCB may contain other IC packages, "Other IC" packages 252 are labeled in the PCB model 250. However, the existence of the other IC packages is not represented in the simulation model in this embodiment.

The ball model 240 of FIG. 2 represents the solder balls 140 of the flip-chip ball grid array IC package 100 of FIG. 1 that extends from a lower surface of the package planes substrate 120 of the IC package 100. The solder balls 140 electrically connect the IC package 100 to a PCB 130. To represent the connection of the solder balls 140 between the IC package 100 in FIG. 1 and PCB 130, the ball model 240 of FIG. 2 is connected to the PCB model 250 through the N signal lines, as well as the power and ground lines. The N signal, power and ground lines extend from the PCB model 250 through the ball model 240. Each of the N signal lines in the ball model 240 includes a series connected inductor 241 and resistor 242. The power line has a series connected inductor 243 and resistor 244, and the ground line has a series connected inductor 245 and resistor 246. These series-connected inductors and resistors represent the parasitics of the solder balls 140, the conductive PCB contact pads 159, and the conductive IC package contact pads 126 of FIG. 1.

The package bypass capacitor model 230 of FIG. 2 represents an IC package bypass capacitor, which is located inside the flip-chip and connected between the power and ground planes. The package bypass capacitor model 230 contains a capacitor 232 connected in series with an inductor 234 and a resistor 236 on a transmission line between the power line 222 and the ground line 224 to model the bypass capacitor. The N signal, power and ground lines extend from the ball model 240 through the package bypass capacitor model 230.

The package planes model 220 of FIG. 2 represents the conductive lines and vias 124 making up the package planes 120 of the IC package 100 of FIG. 1. Conductive lines and vias 124 include power, ground and signal planes, and are represented by N signal, power and ground lines in FIG. 2. The N signal, power and ground lines extend from the package bypass capacitor model 240 through the package planes model 230. The power plane in the IC package 100 is represented by series inductor 226 and resistor 227 on the power line 222, and the ground plane in the IC package 100 is represented by series inductor 228 and resistor 229 on the ground line 224. Coupling of signal planes and the power plane is also represented by coupling signal transmission lines having an inductor 226 to power line 222 in FIG. 2. Coupling of signal planes to the ground plane is represented by coupling signal transmission lines having an inductor 228 to ground line 224 in FIG. 2. Inductors 226 and 228 recognize an electromagnetic coupling that is represented by K-factor term in the model. In this embodiment, the coupled transmission lines are split 100 Ohm transmission lines. The coupling of transmission lines, as well as both of the series inductor and capacitor on the power and ground lines, represents the collective inductance and resistance of the conductive lines and vias 124, which include signal, power and ground vias, in the package planes 120.

The bump model 210 of FIG. 2 represents the solder bumps 110 of the flip-chip ball grid array IC package 100 of FIG. 1 that extend from an upper surfaces of the package planes substrate 120 of the IC package 100. The solder bumps 110 electrically connect the flip-chip 160 to the package planes substrate 120. To represent the connection of the solder bumps 110 between the flip-chip 160 and the package planes substrate 120, the bump model 210 of FIG. 2 is connected to the package planes model 220 through the N signal lines, as well as the power and ground lines. The N signal, power and ground lines extend from the package planes model 220 through the bump model 210. Each of the N signal transmission lines in the bump model 210 includes a series connected inductor 211 and resistor 212. The power line 222 has series connected inductor 213 and a resistor 214, and the ground line 224 has a series connected inductor 215 and resistor 216. These series connected inductor and resistors represent the inductance and resistance of the solder bumps 110.

The simulation model 200 of FIG. 2 approximates actual physical effects of flip-chip and package interactions when the simulation model is used in combination with off-the-shelf time domain simulators such as HSPICE, a program widely used to simulate the performance of analog electronic systems and mixed mode analog and digital systems. The simulation model 200 can be used with simulators such as HSPICE and still allow fast simulation times without compromising accuracy of results. The simulation model 200 has been defined such that it can be scaled to emulate the most complex flip-chip IC packages and can be used to predict and analyze design trade-offs for future package designs.

Although the present invention has been described above with particularity, this was merely to teach one of ordinary skill in the art how to make and use the invention. Many additional modifications will fall within the scope of the invention, as that scope is defined by the following claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A simulation model for simulating an integrated circuit (IC) in a ball grid array package, the simulation model implemented using a simulator, comprising:
   an input/output model comprising mathematical elements enabled to model input and output characteristics of the integrated circuit:
   a bump model enabled to simulate parasitic characteristics of a solder bump connection, the bump model comprising a resistance coupled in series with an inductance, the bump model connected to the input/output model; and
   a package planes model enabled to simulate effects of package planes on operation of the integrated circuit, the package planes model connected to the bump model;
   wherein the package planes model comprises:
      a first inductor connecting signal planes to ground; and
      a second inductor connecting the signal planes to power,
         wherein the package planes model represents power, ground and signal planes in the IC of the package.

2. The simulation model of claim 1, further comprising a package bypass capacitor model wherein the model comprises a capacitor connected between the ground plane and the power plane.

3. The simulation model of claim 1, wherein the package bypass capacitor model further comprises an inductor connected in series with the capacitor between the ground plane and the power plane.

4. The simulation model of claim 3, wherein the package bypass capacitor model further comprises a resistor connected in series with the capacitor and the inductor.

5. The simulation model of claim 1, wherein the series connected inductor and resistor of the bump model further represents the inductance and resistance of solder bumps in the integrated circuit package.

6. The simulation model of claim 1, further comprising a ball model configured to simulate parasitic characteristics of a solder ball connection, the ball model comprising a plurality of series connected resistor and inductors, the ball model being connected to the package planes model.

7. The simulation model of claim 6, wherein the series connected inductor and resistor of the ball model further represents the inductance and resistance of solder balls in the IC package.

8. The simulation model of claim 1, wherein the package comprises a flip-chip ball grid array (FCBGA).

9. The simulation model of claim 1, wherein the first and second inductors are represented by a coupling factor.

10. The simulation model of claim 1, further comprising elements with values set to simulate the effect of power supply droop, ground bounce and cross talk.

11. The simulation model of claim 10, wherein the elements further comprise an input/output buffer used with the bump model.

12. The simulation model of claim 1, further comprising a printed circuit board (PCB) model comprising transmission lines for connecting to the ball model, the PCB model representing a board on which the integrated circuit package is mounted.

13. The simulation model of claim 12, wherein the PCB model further comprises a plurality of pairs of series connected inductors and resistors to represent vias in a PCB.

14. A method for simulating electrical properties of a system including an integrated circuit (IC) provided in a package with external connections to the package formed by a ball grid array, the method comprising:
   modeling, using a simulator, balls of the ball grid array comprising a plurality of series connected resistor and inductor pairs, each series-connected pair representing a ball of the ball grid array; and
   modeling package planes comprising transmission lines connected to the plurality of series-connected resistor and inductor pairs of the ball model, the modeling of the package planes representing power, ground and signal planes in the integrated circuit package;
   wherein modeling of the package planes comprises generating a first inductance value representing the inductor connecting the signal planes to the ground plane and a second inductance value representing the inductor connecting the signal planes to the power plane.

15. The simulation method of claim 14, further comprising:
   modeling bumps of the IC comprising a plurality of series connected resistor and inductor, each series representing a bump of the IC.

16. A non-transitory computer-readable medium having instructions which when executed on a computer perform a method comprising:
   modeling balls of the ball grid array comprising a plurality of series connected resistor and inductor pairs, each series-connected pair representing a ball of the ball grid array; and
   modeling package planes comprising transmission lines connected to the plurality of series-connected resistor and inductor pairs of the ball model, the modeling of the package planes representing power, ground and signal planes in the integrated circuit package;
   wherein modeling of the package planes comprises generating a first inductance value representing the inductor connecting the signal planes to the ground plane and a second inductance value representing the inductor connecting the signal planes to the power plane.

17. The medium of claim 16, further comprising:
   modeling bumps of the IC comprising a plurality of series connected resistor and inductor, each series representing a bump of the IC.

* * * * *